United States Patent [19]

Neumann et al.

[11] Patent Number: 4,557,719
[45] Date of Patent: Dec. 10, 1985

[54] METHOD AND APPARATUS FOR THE SEPARATION OF MEDIA

[75] Inventors: Hans-Jürgen Neumann; Artur Meisberger, both of St. Wendel, Fed. Rep. of Germany

[73] Assignee: Fresenius AG, Bad Homburg, Fed. Rep. of Germany

[21] Appl. No.: 570,465

[22] Filed: Jan. 13, 1984

[30] Foreign Application Priority Data

Jan. 14, 1983 [DE] Fed. Rep. of Germany ....... 3301113

[51] Int. Cl.$^4$ ............................................. B04B 11/04
[52] U.S. Cl. .......................................... 494/37; 494/3
[58] Field of Search ...................... 494/1, 3, 5, 10, 11, 494/37, 42

[56] References Cited

U.S. PATENT DOCUMENTS

| | | | |
|---|---|---|---|
| 3,391,597 | 7/1968 | Gropper | 494/10 |
| 3,480,207 | 11/1969 | Strohmaier | 494/10 |
| 3,778,171 | 12/1973 | Cherrenka | 494/10 |
| 3,955,755 | 5/1976 | Breillatt, Jr. et al. | 494/10 |
| 3,957,197 | 5/1976 | Sartory | 494/10 |
| 3,982,162 | 9/1976 | Olliffe | 494/10 |
| 4,132,349 | 1/1979 | Khoja et al. | 492/10 |
| 4,279,862 | 7/1981 | Bretaudiere et al. | 494/10 |

Primary Examiner—Robert W. Jenkins
Assistant Examiner—Arthur D. Dahlberg
Attorney, Agent, or Firm—Townsend and Townsend

[57] ABSTRACT

A plurality of scanning regions (22) are disposed about the anticipated region of a phase boundary (32) of two media. The change in position of the phase boundary (32) is detected by a scanning means (18) with which each scanning region (22) is scanned and a signal is generated for each of the scanning regions (22). The first media is more radiation-permeable than the second media. A beam path is generated by the scanning means and is detected and evaluated by a discriminator circuit as a logic one. The second media is less radiation-permeable than the first media. The absence of a beam path corresponding to scanning regions in the second media is evaluated by the discriminator circuit as a logic zero. The number of signals per measuring cycle is compared against the actual number of scanning regions (22) to locate and control the position of the phase boundary (32).

25 Claims, 8 Drawing Figures

BAR-SHAPED SCANNING BEAM

NON-CONCENTRIC HOLE ROW (CONCENTRIC PHASE BOUNDARY)

SECTOR FOR SEPARATION BOUNDARY

CONCENTRIC HOLE ROW (NON-CONCENTRIC PHASE BOUNDARY)

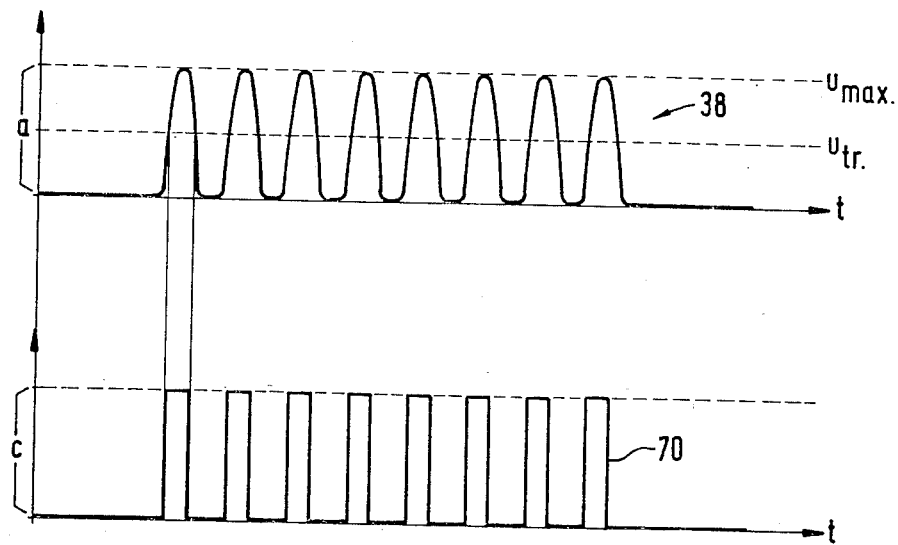
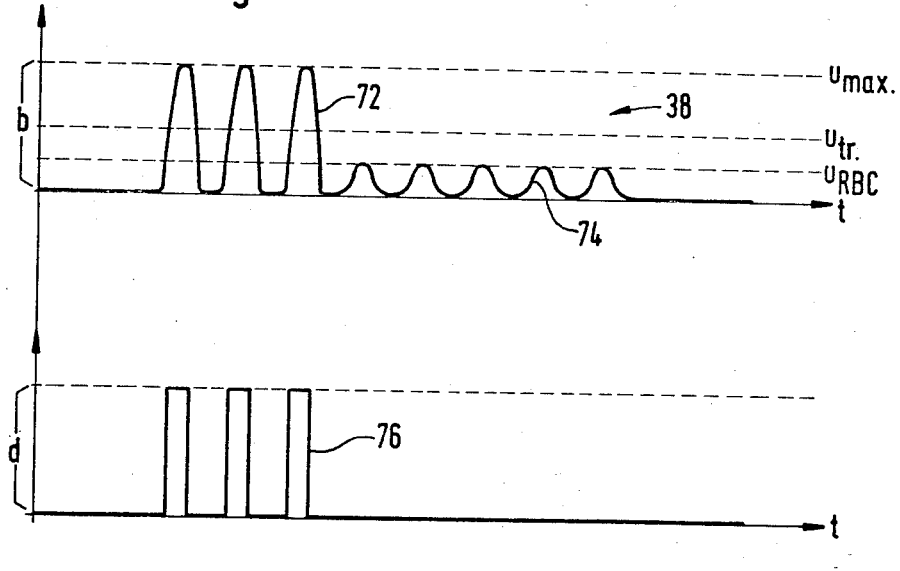

METHOD AND APPARATUS FOR THE SEPARATION OF MEDIA

BACKGROUND OF THE INVENTION

The invention relates to a method for the separation of mixed fluid media in which a phase boundary formed between the separated media is detected.

Such methods are used in particular in conjunction with separation chambers in which media with different physical properties, in particular with different optical properties and in particular with different extinction coefficients, are separated from each other and the media distribution present in the separation chamber is to be detected. Thus, it is known from U.S. Pat. No. 3,955,755 to measure an integral optical signal which is obtained by subjecting a measuring window at the phase boundary between two media to an interrogation beam, and to use this measuring signal itself as actual value for a control for the separation of the media. In such methods, disturbances such as for example fluctuations of the optical properties, for example of the extinction, caused for example by soiling of the measuring window or aging of the optical transmitter, are incorporated completely into the measured result and thus into the control circuit. This makes frequent adjustments of the zero point of the separation necessary. A further possible error results from any change in the intensity during the separation.

An object of the invention is to provide a method and apparatus for the separation of mixed fluid media such that very rapid, trouble-free and adjustment-free control of the separation process is achieved.

SUMMARY OF THE INVENTION

According to the invention, a method and apparatus are provided for separating mixed fluid media having different light permeability in which a plurality of stationary beams are directed through the media and employed to identify a desired phase boundary position between the media, the method using a fixed detection field and establishing a plurality of possible beam paths wherein the beams are evaluated as either present only or absent only at the established positions of the beam paths.

A particular advantage results from the fact that a spatial region about a separating boundary of two media to be separated, hereinafter referred to as transition region, is divided into a plurality of spatially separate scanning regions which are scanned with an interrogation beam or are formed by a plurality of discrete interrogation beams. As a result, optical properties, in particular the extinction, can be determined as a measured quantity in quantized form and an individual decision thus achieved for each scanning region. The measurement result of the scanning can be used for the control of a phase boundary in the transition region between the two media to be separated. This gives the particular advantage that the phase boundary between the media can be controlled to any intended desired value (reference) which is provided in particular by the desired separation boundary. In an example of use of the method according to the invention with a blood centrifuge which splits whole blood into the constituents blood plasma, white cells and red cells, the particular advantage is obtained in that a continuous delivery can take place in that by means of pumps for the individual media the blood centrifuge can be continuously operated. The phase boundary or phase boundaries may be set via the displacement rates of the pumps relatively to a separating boundary or separating boundaries and kept constant. This gives the advantage that the individual pure constituents of the blood can be obtained with maximum efficiency.

A further particular advantage is obtained by scanning the scanning regions in succession. This makes it possible to provide only one scanning means, for example the form of a light barrier, and thus an economic apparatus. A further special advantage results from not having to provide the separation chamber, which for example may also be constructed as rotor of a centrifuge, with electrical terminals but only with scanning regions which may consist of small windows permeable to the interrogation beam.

A further particular advantage of the invention results from the fact that the separation chamber is impermeable to the interrogation beam except for the area of the scanning regions so that a measuring signal can arise only at the scanning regions and no special steps need be adopted to suppress undesirable interferences at other regions. For example, the disturbances caused by the flexible tube rotating with the rotor of the centrifuge can be easily eliminated in this manner.

It is particularly advantageous for the scanning regions to be disposed in a row which intersects the phase boundary between the media and for the scanning means to be able to cover all the scanning regions in succession. When the row of scanning regions is moved past the scanning means the transition region between the media is scanned. As a result of this scanning a time sequence of signals produced by scanning regions is obtained which individually evaluated contain the information on the distribution of the media, in particular the position of the phase boundary. In particular, with media which are optically very different, such as red blood cells and plasma, the signals produced by individual scanning regions can be associated very simply with the digital values 0 and 1 respectively so that in the case of a first medium a one signal and in the case of a second medium a zero signal is generated.

A falsification of the measurement results can also be avoided by providing a trigger means with which the measurement is permitted only in an area immediately around the row of the scanning regions so that the detection is started and possibly terminated after the last scanning region.

A further particular advantage of the invention is that the measurement result can be evaluated in simple form. It is merely necessary to count the number of one signals in one measurement. Due to the arrangement of the row of scanning regions the number of one signals corresponds to a predetermined position of the phase boundary, the actual value of the phase boundary in the transition region. It is possible to control the position of the phase boundary corresponding to the desired number of pulses of the one signals in accordance with the desired value. If for example the phase boundary is to be set to a position between the fourth and fifth scanning region a quantity control means for the media can be controlled in such a manner that the intended desired value is kept to. The control is in a steady-state condition if four pulses of the one signal are counted for each measurement. If only three pulses are counted it means that the phase boundary is displaced too much in the direction of the first medium which is impermeable to the radiation. To increase the proportion of the first medium in the distribution either a pump extracting the first medium can be throttled or a pump extracting the second medium accelerated so that the position of the phase boundary again assumes the desired value.

A further particular advantage of the invention is that a possible fluctuation of the optical properties, in particular the extinction of the second medium, has no influence on the control. When the second medium consists of red blood cells this is particularly advantageous because for example errors due to hemolysis or other colorations of the plasma can be eliminated. It is possible to set the decision threshold, the trigger limit, between the zero signal and the one signal to a non-critical value so that the decision range for a digital yes-no decision is very wide and thus very reliable with respect to the disturbance quantity described. This results in a further particular advantage that the apparatus according to the invention is also insensitive to extinction differences due to contaminations of the scanning regions at the separation chamber or the rotor of the centrifuge and to soiling of the optical systems employed, and to systematic power decreases of the transmitter and receiver of the detection means, and consequently regular adjustment to a zero point can be dispensed with.

When the scanning regions are in the form of a measuring window with a diameter of about 1 mm and the scanning regions are also spaced 1 mm apart from each other, when using a blood centrifuge known per se a recurrence frequency of the one signals in the kHz range results, preferably between 1 and 10 kHz. This has the advantage that a cheap and simple detection means can be employed. In a particularly advantageous embodiment, as scanning means and optical arrangement is employed which operates in the infrared range with the corresponding transmitters and receivers. This obviates disturbances by daylight which can be incident in particular through an observation window for the separation operation. A further particular advantage results from the relative arrangement of the scanning regions which are disposed at a radial surface of the separation chamber and of the scanning means. If the scanning means is rigidly mounted the row of scanning regions rotates in the form of scanning windows, arranged on a radial surface of the separation chamber opposite the scanning means and fixed in rotation with the separating chamber; however, it will also be possible to kinematically interchange the scanning means and scanning regions.

A further advantage of the invention is that the detection of the phase boundary is not directly bound to the rotating part of the separation chamber. With a good resolution it is possible to employ only one forked light barrier instead of a large number of forked light barriers and the number of radiation-permeable scanning regions can be selected with regard to the necessary resolution. The apparatus according to the invention can be used with separation chambers of different construction and the phase boundary can be set by suitable choice of the row of scanning regions. It is not necessary to dispose the scanning regions in a linear row. On the contrary, a high resolution can be obtained in a critical area in that the angle of the row of the scanning regions in said area with respect to the phase boundary is particularly small but in non-critical areas is relatively large, giving an S-shaped overall arrangement. As a result, firstly the phase boundary is held to an exactly predetermined value and secondly the area covered is large. The main advantage of the invention thus resides in that even with a single scanning region the desired solution of the problem is obtained in that a digital one or zero decision is employed for the control and the actual value oscillates about said yes-no decision. The scanning beam for the scanning regions can be made optionally bar-shaped or slot-shaped in that the light beam is produced either with spherical lenses and a gap or produced in bar form directly with a cylindrical lens. Furthermore, a distinction can be made in the arrangement of the scanning regions between concentric and non-concentric to radial arrangement. With the concentric arrangement as scanning beam only a beam of circular cross-section is required, i.e. a beam which is easy to generate; however, the phase boundary in the separation chamber must not be concentric, which is possible only with continuous flow and moreover involves dependence on the flow rates and the geometry. In contrast, with the non-concentric arrangement of the scanning regions a light bar must be generated and for this purpose a lower light intensity can be employed. Furthermore, advantageously instead of producing the scanning regions by a "mask" on the separation chamber said scanning regions can be produced by triggering the transmitter or receiver in said region which is also possible via a spatially controlled light beam. This means that a particular advantage of the invention is that with a single spatially fixed scanning beam a spatial resolution of the separating boundary is possible in that consecutive signals describe different spatial positions.

Further advantages, features and details of the invention will be explained in the following description with the aid of the drawings, wherein:

BRIEF DESCRIPTION OF THE DRAWINGS

FIG. 6 is a graphical illustration of the time variation of the measuring signal and the detection signal with 8 one pulses of the one signal, and FIG. 7 is an illustration of the time variation of the measuring signal and the detection signal with three pulses of the one signal.

DESCRIPTION OF THE SPECIFIC EMBODIMENTS

Figure 1A:
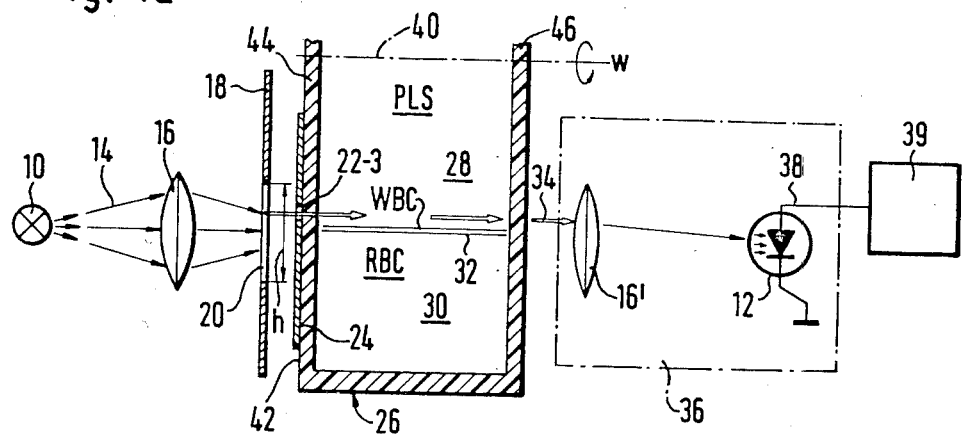
FIGS. 1a+b show a schematic sectional elevation of a first embodiment of the measuring apparatus according to the invention.
Figure 1B:
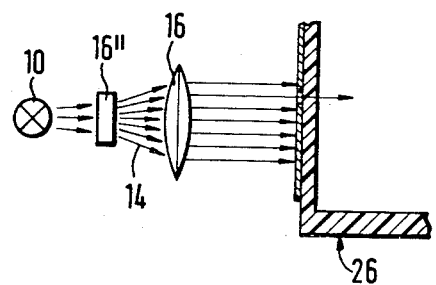

FIGS. 1a and 1b illustrate a measuring arrangement for an apparatus according to the invention in reference to which the beam path from a radiation source 10 to a detection means 12 will be explained in detail. The radiation source 10 is constructed as a transmitter diode, specifically as an infrared diode and emits an interrogation beam 14 which is focused by a lens arrangement 16 to increase the intensity. Disposed in the beam path behind the lens arrangement 16 is a scanning means 18 which is constructed as a scanning slot and comprises a window 20 having a height h. By a lens arrangement 16 the interrogation beam 14 is focused in the plane in which scanning regions 22 lie, of which one scanning region 22-3 is illustrated. The scanning regions 22 are provided as scanning windows in a screen means 24 which is impermeable to the interrogation beam 14. The screen means 24 is secured on a rotor or a separation chamber 26 which consists of material permeable to the interrogation beam 14, preferably of plastic. A separation means is here referred to as separation chamber. In the separation chamber 26 there is a first medium 28 and a second medium 30. The first medium 28 consists in the example of embodiment illustrated of blood plasma PLS and white blood cells WBC. The second medium 30 consists of red blood cells RBC. The first medium 28 is permeable to the interrogation beam 14 whilst the second medium 30 is less permeable to the interrogation beam 14. In the position of the separation chamber 26 illustrated in FIG. 1 the scanning region 22-3 is in coincidence with the scanning means 18. Since the scanning region 22-3 is provided at a point associated with the first medium 28 above the phase boundary 32, the light 34 passing through the scanning region 22-3 will pass through the first medium 28 and to the detection arrangement 36. In the detection means 12, which in the embodiment illustrated is constructed as a photodiode or phototransistor, the light intensity 34 is converted to a measuring signal 38. The measuring signal 38 is supplied to a control means 39.

The separation chamber 26 is rotatable about an axis 40 so that the latter provides a balancing and guiding of the separation chamber 26. By rotating the separation chamber 26 with high angular velocity w about the axis 40 a centrifugal force is exerted on the mixture of media disposed therein so that the distribution illustrated in FIG. 1 results. The red blood cells RBC have a higher specific density than the white blood cells WBC which in turn are heavier than the blood plasma PLS. In addition to the scanning region 22-3 illustrated further scanning regions are arranged spatially offset which together cover a possible detection region for the position of the phase boundary 32 with the height h. When the phase boundary 32 in FIG. 1 lies below the particular scanning region observed the light intensity 34 is emitted as one signal 70 whilst the light intensity 34 becomes a zero signal when the phase boundary 32 lies above the scanning region 22 considered. The screen means 24 is disposed annularly on a radial surface 42 of the separation chamber 26 so that the entire separation chamber is covered except for the detection window. However, it is of course also possible to form an end wall 44 in this separation chamber 26 as screen means 24. It is likewise possible to arrange the measuring arrangement comprising the scanning means 18 and the screen means 24 on the other end wall 46 of the separation chamber 26. In this case the interrogation beam 14 first passes through the first medium 28 or is absorbed by the second medium 30 and is then incident on the scanning regions 22 which are then scanned by the scanning means 18 and produce the measuring signal 34. Alternatively, the kinematic converse may be provided in that it is not the scanning means 18 but the scanning regions 22 which are fixedly connected to the support means for the mounting of the separation chamber 26 whilst the scanning means 18 are connected instead of the scanning regions 22 fixed in rotation to the separation chamber 26. In this case it is for example possible to derive the scanning regions 22 by means of individual fibers of a glassfiber cable from the radiation source 10 and the lens arrangement 16 and the screen means 24 may be dispensed with.

Figure 2:
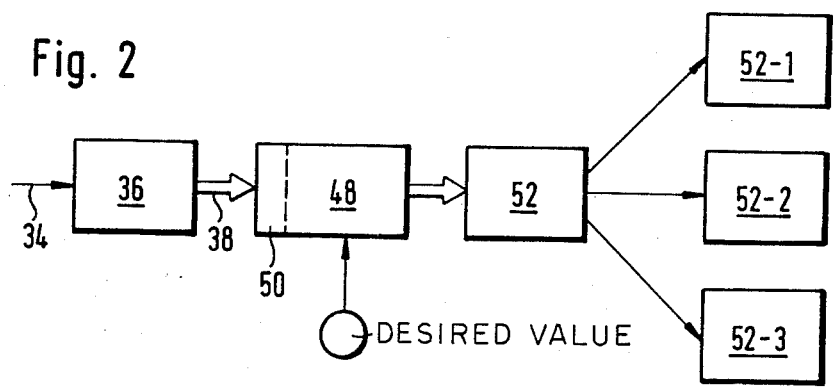
FIG. 2 is a schematic illustration of a block diagram of a circuit for the embodiment of FIG. 1.

In FIG. 2 and the further Figures of the drawings identical or corresponding parts are provided with corresponding reference numerals and are not described in detail. The detection signal 38 is produced by a signal processing means, for example a Schmitt trigger, and then supplied to a counting means 48, the input stage of the counting means comprising a discriminator circuit 50 in which it is decided whether the pulse of the detection signal 30 is a zero signal or a one signal. For this purpose the discriminator circuit 50 provides a self-referenced trigger threshold which can also be made adjustable. In the counting means 48 the number of one signals per measuring cycle is counted, a measuring cycle being one revolution of the separation chamber and compared with a desired value. The comparison result is supplied as control difference to the flow rate control of the quantity control means 52, which comprises pumps 52-1, 52-2, 52-3. The pumps act in a manner known per se as hose pumps on connections for the blood plasma PLS, the white blood cells WBC and the red blood cells RBC. The quantity control means 52 controls the pumps 52-1 to 52-3 in such a manner that the phase boundary 32 in accordance with the number of one signals counted per measuring cycle in the counter means 48 is regulated to the intended desired value when a deviation has been detected in one or the other direction.

Figure 3:
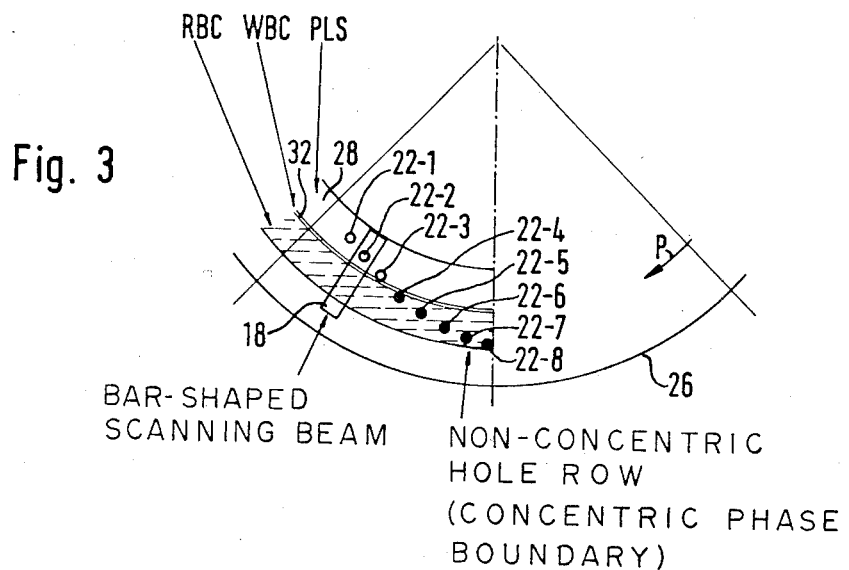
FIG. 3 is a schematic illustration of part of the measuring apparatus and part of a separation chamber.

FIG. 3 is an illustration of the row of scanning regions 22. The scanning regions 22 are provided in an area at which the phase boundary 32 extends concentrically with respect to the axis of rotation of the centrifuge. The row of scanning regions 22 must according to the invention intersect the phase boundary so that in the embodiment illustrated in FIG. 3 it is not disposed concentrically. The scanning regions 22-1 to 22-3 cover in the example of embodiment the first medium 28 whilst the scanning regions 22-4 to 22-8 cover the second medium 30. On rotation of the separation chamber 26 in the direction of the arrow P the scanning means 18 successively scans the scanning regions 22-1 to 22-8. The three first scanning regions 22 produce a one signal as measuring signal and are therefore illustrated as empty circles. The scanning regions 22-4 to 22-8 produce a zero signal as measuring signal 34 and are therefore illustrated as black solid circles. The diameter of the scanning regions 22 is 1 mm and the distance of the scanning regions 22 from each other is also 1 mm. Since the scanning means 18 has a slot width and thus a resolution of about 1 mm, on rotation of the separation chamber 26 in the direction of the arrow P a clear bright/dark control is achieved and in a measuring cycle a sequence of three one signals emitted in pulse form. If the requirements made of the resolution are not as high the diameter of the scanning means 22 may be increased so that a smaller sensitivity of the detection arrangement 36 or a lower intensity of the interrogation beam 14 is required.

In the embodiment illustrated in FIG. 3 of the apparatus according to the invention the scanning means 18 is constructed as bar-like scanning beam which is achieved by a slit diaphragm immediately behind the radiation source 10 so that a bar-shaped beam is projected through the lens arrangement 16 onto the screen means 25.

Figure 4:
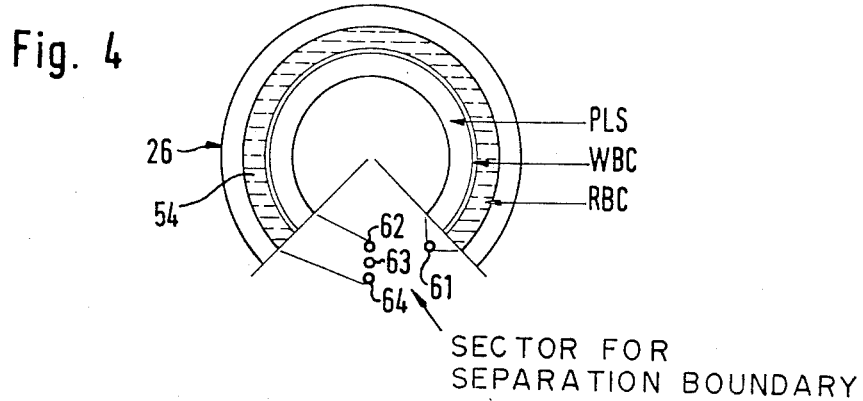
FIG. 4 is a schematic illustration of a separation chamber in a further embodiment.

FIG. 4 is a schematic overall view of a separation chamber. Via a connection 61 whole blood WB is introduced into the separation chamber. Due to the centrifugal force the constituents of the whole blood WB are gradually separated, separation being in this case the conversion of a mixed medium containing at least two media of equal spatial distribution into at least two media in each of which one component is predominant. The theoretically attainable objective of the division is the complete separation of the constituents from each other during the continuous operation. During the residence time in the annular separation passage 54 the whole blood is broken down into its constituents plasma PLS, white blood cells WBC and red blood cells RBC. For these constituents removal connections 62, 63 and 64 respectively are provided to each of which in the ideal case only the corresponding constituent is to be supplied in pure form. Since the proportion of the white blood cells WBC in whole blood WB is relatively small, the position of the phase boundary is particularly critical at this connection and requires careful control which is achieved with the invention.

Since whole blood WB is continuously supplied at the connection 61 a continuous displacement of the blood constituents at the connections 62, 63 and 64 is also necessary. The position of the phase boundary results from the particular ratio of the pumping rates.

With the method according to the invention a high accuracy of control can be achieved so that white blood cells WBC can also be recovered although they constitute a total of only about 0.5% to 2% of the whole blood WB. Moreover, the blood component to be recovered is as pure and complete as possible so that the necessary amount of whole blood WB may remain relatively small.

Figure 5:
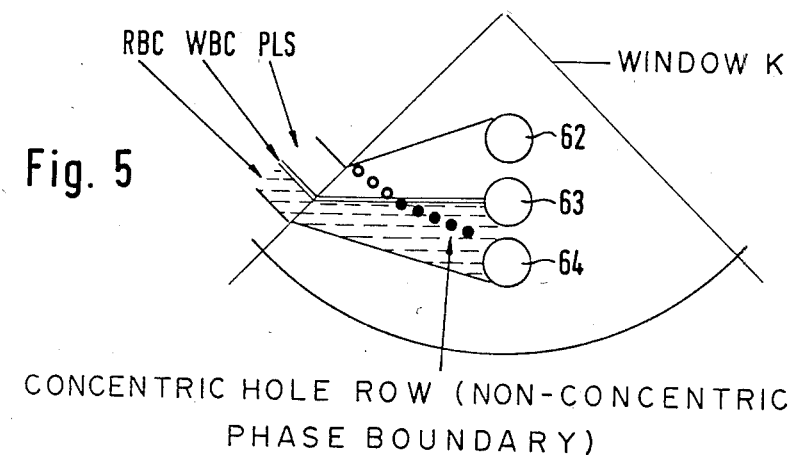
FIG. 5 is a schematic illustration of a fragment of a separation chamber according to FIG. 4.

FIG. 5 is a schematic illustration of a further possible embodiment of the measuring arrangement. In the embodiment illustrated, the position of the phase boundary is detected in the area of the connections 62–64. At this point the phase boundary is not concentric. The nonconcentric form of a phase boundary can be achieved in non-stationary operation, i.e. by displacement of the blood constituents by pumps and withdrawal through the connections 62, 63 and 64. Again provided inclined to the phase boundary is a row of scanning regions 22 in the form of a row of holes. The particular advantage of this embodiment is that the scanning means 18 can also have a circular cross-section of the magnitude of the scanning regions 22 so that a maximum light intensity is available for each scanning region 22. This is achieved in that the hole row is disposed concentrically about the axis of rotation of the centrifuge.

A further particular advantage of the embodiment with bar or slot-scanning means 18 is its insensitivity to various errors caused for example by non-centric rotations, misadjustments of the optical system or imbalance.

FIG. 6 shows a signal variation corresponding to a detection signal with 8 one signals. Such a detection signal is produced when the first optically thinner medium 28 covers the entire detection area. By setting a trigger threshold to a signal amplitude $u_{tr}$ with the aid of the discriminator circuit 50 the signal 70 can be produced.

In FIG. 7 the signal variation of the detected signals is illustrated in an operating condition as also illustrated in FIGS. 3 and 4. Corresponding to the presence of blood plasma PLS at the first three scanning regions 22-1 to 22-3 three one signals 72 can be produced followed in accordance with the presence of the red blood cells RBC by five zero signals. With the aid of the discriminator circuit 50 on application of the detection signal 38 illustrated in FIG. 7 the signals shown by the signal curve 76 can be produced. The amplitude ratio of the detection signal 38 between the one signals 72 and zero signals 74 is now more than 20 so that the setting of the trigger threshold $u_{tr}$ is not critical. Of course, it is also possible to trigger in dependence on the flanks.

Apart from the embodiments illustrated it is also possible to use the apparatus according to the invention in conjunction with spiral centrifuges or other rotating systems. It is likewise possible to employ apart from infrared light beams other beams as interrogation beam 14 and to separate other media than those described, including media in other aggregate conditions. Furthermore, it is possible to produce the demixing or separation by physical forces other than centrifugal forces.

A further embodiment is illustrated in FIG. 1b where the light bar having a length h which can be produced by the scanning means 18 with a window 20 is generated by a cylindrical lens 16'' so that the scanning regions, as illustrated in FIG. 3, are sensed by the bar-shaped scanning beam and the beams produce a resulting beam of a greater or lesser light intensity 34 depending on the particular medium traversed, as shown in analagous manner in FIG. 1a.

Of course, a further embodiment could be the arrangement of detection means 36 and the beam generation according to FIG. 1a or 1b on the same side of the separation chamber 26. In this case, the rear end wall 46 of the separation chamber 26 would have to have a mirror surface directed into the interior of the separation chamber so that the light rays passing through the various scanning regions 22-1 to 22-8 are reflected at said mirror surface and through the associated scanning regions to the detection means 36 disposed on the same side. In such an embodiment the scanning regions 22 as in the embodiments described above can also be formed at a rear wall 46 so that the resolution of the light bar into individual scanning regions does not take place at the front end face 44 as in the other embodiments described above but afterwards at the rear end face 46. In an embodiment in which the rear end face 46 has a reflecting surface the individual scanning regions 22 may be made as individual mirror areas or in the form of an overall mirror area covered in mask manner.

We claim:

1. Method of separating flowable and mixed media in a separation apparatus, in particular in a centrifuge, of which at least a first medium is more permeable to optical radiation and at least a second medium is distinguishably less permeable to optical radiation, in which a phase boundary is formed between said separated first and second media, said optical radiation for forming a plurality of beams upon traversal of a detection area, wherein said beams are measured at a measuring means after traversing said detection area through which the separated media flow and a measured result is obtained therefrom and developed into a deviation control signal which is provided to a control means with which an intended phase boundary position is controlled about an intended reference position, the improvement characterized in that a plurality of regions of said detection area are illuminated by said optical radiation and at least one discrete beam path through said media is formed at least in that portion of the measuring means region in which the detection region passes through the region of the measuring means, the beam path being formed in the more radiation-permeable medium, wherein the presence of said beam path to the measuring means is evaluated by a discriminator circuit as a logic one and absence of a beam path to the measuring means is evaluated as a logic zero.

2. Method according to claim 1, wherein the improvement is characterized in that at least two discrete beam paths are detected and evaluated in relationship to a total number of scanning regions per measuring cycle, wherein a measuring cycle represents a rotation of a centrifuge.

3. Method according to claim 2, wherein the improvement is further characterized in that only one beam path is detected in said region of said measuring means during a preselected time interval.

4. Method according to claim 3, wherein the improvement is further characterized in that the number of beam paths through said first medium are detected and counted during a measuring cycle.

5. Method according to claim 4, wherein the improvement is further characterized in that a counting means registers said number of beam paths in a measuring cycle and supplies said registered number to said control means.

6. Method according to claim 5, wherein the improvement is further characterized in that the position of the phase boundary between the media is controlled via a flow rate control acting on the media to regulate the intended position of said phase boundary.

7. Method according to claim 2, wherein the improvement is further characterized in that the position of the phase boundary between the media is controlled via a flow rate control means acting on the media to regulate the intended position of said phase boundary.

8. Method according to claim 3, wherein the improvement is further characterized in that the position of the phase boundary between the media is controlled via a flow rate control acting on the media to regulate the intended position of said phase boundary.

9. Method according to claim 1, wherein the improvement is further characterized in that said intended phase boundary position is regulated to said intended reference position via a flow rate control means.

10. Apparatus for carrying out a method of separating flowable and mixed media in which at least a first medium is more permeable to optical radiation and at least a second medium is distinguishably less permeable to optical radiation, in which a phase boundary is formed between said separated first and second media, said optical radiation for forming a plurality of beams upon traversal of a detection area, wherein said beams are measured at a measuring means after traversing said detection area through which the separated media flow and a measured result obtained therefrom and developed into a deviation control signal which is provided to a control means with which an intended phase boundary position is controlled about an intended reference position, the improvement comprising: a separation chamber; means for illuminating with optical radiation a plurality of regions of said detection area and means for forming at least one discrete beam path through said media in the more radiation-permeable region of said media; a detection means opposing said illumination means for detecting the position of the phase boundary of media in said separation chamber; a discriminator circuit; and a means for regulating the position of the phase boundary to an intended phase boundary position, such that the presence of said beam path is evaluated by the discriminator circuit as a logic 1 and the absence of a beam path to the measuring means is evaluated as a logic 0.

11. Apparatus according to claim 10, wherein the improvement is further characterized in that said beam forming means comprises a scanning means of at least two discrete scanning regions (22) are disposed said scanning regions to be evaluated by said detection means (36), wherein at least one scanning region (22) is disposed on each side of the intended position of the phase boundary (32).

12. Apparatus according to claim 4, wherein the improvement is further characterized in that the scanning means (18) comprises a slit mask.

13. Apparatus according to claim 12, wherein the improvement is further characterized in that a counting means (48) is connected to the detection means.

14. Apparatus according to claim 13, wherein the improvement is further characterized in that a trigger threshold is provided to the counting means 48).

15. Apparatus according to claim 11, wherein the improvement is further characterized in that the scanning regions (22) are formed on a radial surface (42) of the separation chamber (26) which rotate with respect to said separation chamber (26) and the scanning means (18) is stationary and disposed opposite a radial surface (42).

16. Apparatus according to claim 11, wherein, the improvement is further characterized in that the scanning regions (22) define in succession a row of orifices which intersects the intended position of the phase boundary (32).

17. Apparatus according to claim 16 wherein the improvement is further characterized in that the scanning regions (22) have greater resolution in the area of the intended phase boundary than outside the area of the intended phase boundary.

18. Apparatus according to claim 17 wherein the improvement is further characterized in that the line formed by the scanning regions is S-shaped such that a greater number of scanning regions are disposed through the area of the intended phase boundary than are disposed outside the area of the intended phase boundary.

19. Apparatus according to claim 11, wherein the improvement is further characterized in that the scanning regions (22) are disposed at a distance from each other which corresponds to a maximum cross-dimension of said scanning regions (22).

20. Apparatus according to claim 11, wherein the improvement is further characterized in that the scanning regions (22) have a maximum cross-dimension of 1 mm.

21. Apparatus according to claim 11, wherein the improvement is further characterized in that the scanning means (18) comprises a mask with bar-shaped slits disposed transversely to the phase boundary (32).

22. Apparatus according to claim 10, wherein the improvement is further characterized in that the separation chamber (26) is a rotor of a centrifuge.

23. Apparatus according to claim 10, wherein the improvement is further characterized in that the scanning means (18) has a width corresponding to the width of the area traversed by the scanning regions.

24. Apparatus according to claim 10, wherein the improvement is further characterized in that the radiation source (10) and the detection arrangement (36) are disposed on the same side of the separation chamber (26) and the rear end wall (46) of the separation chamber (26) comprises a mirror surface.

25. Apparatus according to claim 24, wherein the improvement is further characterized in that the scanning regions (22) comprise mirror imaging means of reflecting from a rear end wall (46).

* * * * *